(12) United States Patent
Mühle et al.

(10) Patent No.: US 9,358,706 B2
(45) Date of Patent: Jun. 7, 2016

(54) PROCESS FOR MANUFACTURING A HEADLIGHT LENS FOR A MOTOR VEHICLE HEADLIGHT

(75) Inventors: Peter Mühle, Jena (DE); Alois Willke, Buseck (DE); Hagen Goldammer, Jena (DE); Volker Schöppner, Verl (DE); Christian Leister, Paderborn (DE)

(73) Assignee: Docter Optics SE, Neustadt an der Orla (DE)

( * ) Notice: Subject to any disclaimer, the term of this patent is extended or adjusted under 35 U.S.C. 154(b) by 282 days.

(21) Appl. No.: 14/114,315

(22) PCT Filed: Feb. 3, 2012

(86) PCT No.: PCT/EP2012/000496
§ 371 (c)(1),
(2), (4) Date: Oct. 28, 2013

(87) PCT Pub. No.: WO2012/146328
PCT Pub. Date: Nov. 1, 2012

(65) Prior Publication Data
US 2014/0042650 A1    Feb. 13, 2014

(30) Foreign Application Priority Data
Apr. 29, 2011 (DE) .......... 10 2011 100 071

(51) Int. Cl.
*B29C 45/00* (2006.01)
*B29C 45/56* (2006.01)
*B29D 11/00* (2006.01)
(Continued)

(52) U.S. Cl.
CPC ........... *B29C 45/0055* (2013.01); *B29C 43/021* (2013.01); *B29C 45/561* (2013.01); *B29D 11/00317* (2013.01); *F21S 48/1258* (2013.01);
(Continued)

(58) Field of Classification Search
CPC .. B29C 45/0055; B29C 45/561; B29C 43/021
USPC .......................................... 264/1.7–2.4, 296
See application file for complete search history.

(56) References Cited

U.S. PATENT DOCUMENTS 5,141,677 A * 8/1992 Fogarty ............... A61F 2/16
264/1.36
8,414,170 B2 * 4/2013 Erward ............... F21S 48/1258
362/487

(Continued)

FOREIGN PATENT DOCUMENTS

DE 102007037204 A1 2/2009
DE 102007044517 A1 3/2009
(Continued)

OTHER PUBLICATIONS

International Preliminary Report on Patentability prepared for PCT/EP2012/000496 and issued on Oct. 29, 2013.
(Continued)

*Primary Examiner* — Joseph S Del Sole
*Assistant Examiner* — Thukhanh T Nguyen
(74) *Attorney, Agent, or Firm* — Barnes & Thornburg LLP

(57) ABSTRACT

A process for manufacturing a headlight lens for a vehicle headlight, wherein a blank is molded from transparent plastic material by means of an injection molding process, and wherein the blank is subsequently blank-molded by means of a final contour mold to form the headlight lens.

18 Claims, 12 Drawing Sheets

(51) Int. Cl.
*B29C 43/02* (2006.01)
*F21S 8/10* (2006.01)
*B29L 11/00* (2006.01)

(52) U.S. Cl.
CPC ...... *F21S 48/1283* (2013.01); *B29L 2011/0016* (2013.01)

(56) References Cited

U.S. PATENT DOCUMENTS

| | | | | |
|---|---|---|---|---|
| 8,601,835 | B2* | 12/2013 | Bonitz | C03B 11/08 65/66 |
| 8,944,649 | B2* | 2/2015 | Fedosik | F21S 48/1159 362/511 |
| 2002/0046577 | A1 | 4/2002 | Maeda et al. | |
| 2004/0244421 | A1* | 12/2004 | Kato | B29C 33/3857 65/26 |
| 2010/0202154 | A1* | 8/2010 | Hamkens | B29C 43/021 264/1.32 |

FOREIGN PATENT DOCUMENTS

| | | |
|---|---|---|
| DE | 102008049860 A1 | 4/2010 |
| EP | 1584863 A2 | 10/2005 |
| WO | 2007/095895 A1 | 8/2007 |

OTHER PUBLICATIONS

PCT International Search Report completed by ISA/EP on May 25, 2012 and issued in connection with PCT/EP2012/00496.

* cited by examiner

PRIOR ART

PROCESS FOR MANUFACTURING A HEADLIGHT LENS FOR A MOTOR VEHICLE HEADLIGHT

CROSS REFERENCE TO RELATED APPLICATIONS

This application is a U.S. nationalization under 35 U.S.C. §371 of International Application No. PCT/EP2012/000496, filed Feb. 3, 2012, which claims priority to German Patent Application No. 102011100071.6 filed Apr. 29, 2011.

FIELD OF THE INVENTION

The invention relates to a process for manufacturing a headlight lens for a vehicle headlight, in particular for a motor vehicle headlight, wherein a blank is molded from transparent, in particular amorphous plastic material by means of an injection molding process in an injection mold, and wherein the blank is subsequently pressed (press-molded), in particular blank-molded (blank-pressed) by means of a final shape/contour mold to form the lens element. Such a process is known from DE 10 2007 037 204 A1.

BACKGROUND INFORMATION

DE 699 23 847 T2 discloses a process for manufacturing an optical mold body from thermoplastic resin by injection pressure molding, wherein the volume of a mold cavity expands more strongly than the volume of the optical mold body in question, and wherein molten thermoplastic resin is injected into the mold cavity through an injection molding passage. In the expanded mold cavity, the material is subsequently pressed to a predetermined thickness of the medial area of the mold body or to a thickness which is by up to 200 µm smaller than the predetermined thickness. After pressing of the material in the expanded cavity, the pressure of the resin in the injection molding passage and the molding pressure in the mold cavity are changed within such boundaries that the width of change does not exceed ±100 µm of the predetermined thickness of a medial area of the mold body in order to be able to obtain the predetermined thickness of the finished mold body. Subsequently, the molten thermoplastic resin is retained within the mold cavity for sufficient time until the mold body in question has been formed. Thereafter, the thus obtained mold body is removed from the mold cavity.

According to DE 699 23 847 T2, a method for manufacturing an optical mold body from thermoplastic resin by injection pressure molding as described in U.S. Pat. No. 4,540,534, EP 0 640 460 and JP 9-057794 has to be distinguished there from, which method comprises
- expanding the volume of a mold cavity beyond the volume of the optical mold body in question,
- injection molding of molten thermoplastic resin in(to) the mold cavity through an injection molding cylinder,
- pressing the expanded cavity to a predetermined thickness of the mold body,
- returning a surplus of the thermoplastic resin which has occurred by the molding step, into the injection molding cylinder,
- leaving the molten thermoplastic resin in the mold cavity until the mold body in question has been shaped, and removing the obtained mold body from the mold cavity.

DE 102 20 671 A1 discloses a plastic lens consisting of a collective lens of plastic material having a high Abbé number, and a dispersion lens connected therewith integrally and in positive fit of plastic material having a comparably low Abbé number regarding the plastic material of the collective lens, wherein the thermal expansion coefficients of the plastic materials are essentially the same.

Headlight lenses are known e.g. from WO 02/31543 A1, U.S. Pat. No. 6,992,804 B2, WO 03/074251 A1 and DE 100 52 653 A1. Further vehicle headlights are known e.g. from DE 100 33 766 A1, EP 0 272 646 A1, DE 101 18 687 A1 and DE 198 29 586 A1.

It is an object of the invention to reduce the costs for manufacturing lens elements, in particular elements for illumination purposes, particularly for the manufacturing of headlight lenses for vehicle headlights. In this context it is particularly desirable to manufacture especially high-value lens elements, in particular headlight lenses. It is a further object of the invention to improve the process disclosed in DE 10 2007 037 204 A1. In this context, it is particularly aimed at achieving a higher accuracy of contour.

SUMMARY

The aforementioned object is achieved by a process for manufacturing an optical lens element, in particular for illumination purposes, particularly for manufacturing a headlight lens for a vehicle headlight, in particular for a motor vehicle headlight, wherein a blank of transparent, in particular amorphous plastic material is molded by means of an injection molding process in an injection mold having an injection mold cavity whose thickness is no smaller than 50% of the diameter of the injection cavity (in particular, however, smaller than 100% of the injection cavity, and wherein the blank is subsequently pressed (molded under pressure), in particular blank-molded by means of a final shape/contour mold to form the lens element. Herein, the blank is, in particular, molded such that it has essentially the same mass as that of the lens element.

A lens element in the sense of the invention is a headlight lens for imaging a light-dark-borderline on a roadway.

In the sense of the invention, the term blank-pressing or blank-molding is, in particular, to be understood in a manner that an optically operative (or effective) surface is to be pressed/molded under pressure such that any subsequent (finishing or) post-treatment of the contour of this optically operative surface may be dispensed with or does not apply or will not have to be provided for, respectively.

An injection pressing mold in the sense of DE 10 2007 037 204 A1 may act as an example of embodiment for an injection mold. An injection pressing process in the sense of DE 10 2007 037 204 A1 may act as an example of embodiment for an injection molding process. In the sense of the invention, the thickness and the diameter extend, in particular, orthogonally with respect to each other. In the sense of the invention, the thickness is, in particular, the maximum extension of the injection mold cavity in one direction. In the sense of the invention, a diameter of an injection mold cavity is, in particular, the maximum extension of the injection mold cavity in another direction, particularly an orthogonal direction. The directions concerning the thickness and the diameter have, in particular, to be selected such that the diameter is larger than the thickness. In the sense of the invention, a diameter of an injection mold cavity particularly relates to the maximum circular cross sectional face of the injection mold cavity. In the sense of the invention, a diameter of an injection mold cavity is, in particular, the diameter of the maximum circular cross sectional face of the injection mold cavity.

In an embodiment of the invention the blank is cooled and heated again or is taken out of the injection mold and subsequently cooled and heated again, respectively. Herein, the temperature gradient of the blank is in particular inversed. Thus, the core of the blank, when removed from the injection-pressing mold, will be warmer than the outer region of the blank. After the heating, however, the outer region of the blank is in particular warmer than the core of the blank. It may be provided for to cool the blank down on a support mold in order to adjust or "impress" the support contour influenced by shrinkage.

In an embodiment of the invention the thickness of the injection mold cavity is no larger than 70% of the diameter of the injection mold cavity.

In an embodiment of the invention the injection mold cavity includes a first area/region for forming/molding a first convex surface of the blank immediately after filling the injection mold and a second area/region opposing the first area, and for forming/molding a second convex surface of the blank immediately after filling the injection mold, wherein the first area and the second area form a transition with each other, which transition essentially has a continuous first derivative or is configured without any bend or kink, respectively. In particular, it is provided for that the first area/region and the second area/region are curved with different curvatures. In particular, it is provided for that the less strongly curved area/region will, later on, partially form the contact face between the bottom mold and the blank when delivery to the pressing mold occurs.

In an embodiment of the invention the injection mold for forming the injection mold cavity includes a first injection mold part/component and at least a second injection mold part/component, wherein the portion of the injection mold cavity of the first injection mold part and the portion of the injection mold cavity of the second injection mold part form a transition with each other, which transition essentially has a continuous first derivative or is configured without any bend or kink, respectively. In an embodiment of the invention the blank is taken out of the injection mold by and/or after moving apart the first injection mold component and the second injection component from each other.

In an embodiment of the invention the blank is taken out of the injection mold before its mean temperature goes below the melting temperature of the plastic material and/or below the flow temperature of the plastic material.

In an embodiment of the invention the final contour mold includes a bottom mold and a top mold, wherein a blank is placed on the bottom mold for pressing. In an embodiment of the invention is this may, for example, be assisted during the cooling down by means of a supporting mold (see above).

The injection molding process may occur, according to one embodiment of the invention, by direct injection of sole of the blank without any sprue channel (hot runner).

The injection mold cavity has, in particular, a volume of more than 40 ccm. The injection mold cavity has, in particular, a volume of up to 100 ccm.

In an embodiment of the invention, a light dispersing surface structure may be embossed, by means of the final shape/contour mold, into an optically operative surface of the lens element. An appropriate light dispersing surface structure may e.g. comprise a modulation and/or a (surface) roughness of at least 0.05 µm in particular at least 0.08 µm or it may be designed as a modulation, if necessary having a (surface) roughness of at least 0.05 µm in particular at least 0.08 µm respectively. Roughness in the sense of the invention is to be defined particularly as Ra, in particular according to ISO 4287. In an embodiment of the invention, the light dispersing surface structure may comprise a structure simulating the surface of a golf ball, or it may be designed as a structure imitating a golf ball surface. Appropriate surface structures dispersing light have e.g. been disclosed in DE 10 2005 009 556, DE 102 26 471 B4 and DE 299 14 114 U1. Further embodiments of surface structures dispersing light have been disclosed in German Letters Patent 1 009 964, DE 36 02 262 C2, DE 40 31 352 A1, U.S. Pat. No. 6,130,777, US 2001/0033726 A1, JP 10123307 A, JP 09159810A, and JP 01147403A.

The aforementioned object is, moreover, achieved by a process—in particular comprising one or several of the aforementioned features—for manufacturing an optical lens element, in particular for illumination purposes, particularly for manufacturing a headlight lens for a vehicle headlight, in particular for a motor vehicle headlight, wherein a blank of transparent, in particular amorphous plastic material is molded and shaped by means of an injection molding process in an injection mold having an injection mold cavity, which includes a first area/region for molding/shaping a first convex surface of the blank immediately after filling the injection mold and a second area/region opposing the first region, for molding/shaping a second convex surface of the blank immediately after filling the injection mold, wherein the first region and the second region essentially form a transition with each other having a continuous first derivative or without any bend/kink, respectively, and wherein the blank is subsequently, by means of a final contour mold, blank-molded/shaped, in particular blank-molded/pressed to form the lens element. Herein, the blank is in particular molded/shaped such that it essentially has the same mass as the lens element.

The aforementioned object is, moreover, achieved by a process—in particular comprising one or several of the aforementioned features—for manufacturing an optical lens element, in particular for illumination purposes, particularly for manufacturing a headlight lens for a vehicle headlight, in particular for a motor vehicle headlight, wherein a blank of transparent, in particular amorphous plastic material is molded and shaped by means of an injection molding process in an injection mold which, for forming an injection mold cavity, includes a first injection mold component and a second injection mold component, wherein the portion of the injection mold cavity of the first injection mold component and the portion of the injection mold cavity of the second injection mold component essentially form a transition with each other having a continuous first derivative or without any bend/kink, respectively, wherein the blank is taken out of the injection mold by and/or after moving apart the first injection mold component and the second injection mold component, and wherein the blank is subsequently, by means of a final contour mold, press-molded/shaped, in particular blank-molded/pressed to form the lens element. Herein, the blank is in particular molded/shaped such that it essentially has the same mass as the lens element.

The aforementioned object is, moreover, achieved by a process—in particular comprising one or several of the aforementioned features—for manufacturing an optical lens element, in particular for illumination purposes, particularly for manufacturing a headlight lens for a vehicle headlight, in particular for a motor vehicle headlight, wherein a blank of transparent, in particular amorphous plastic material is molded/shaped by means of an injection molding process in an injection mold, wherein the blank is taken out of the injection mold before its mean temperature goes below the melting temperature of the plastic material and/or below the flow temperature of the plastic material, and wherein the blank is subsequently, by means of a final contour mold, blank-molded/shaped, in particular blank-molded/pressed to form the lens element. Herein, the blank is in particular molded/shaped such that it essentially has the same mass as the lens element.

The aforementioned object is, moreover, achieved by a process—in particular comprising one or several of the aforementioned features—for manufacturing an optical lens element, in particular for illumination purposes, particularly for manufacturing a headlight lens for a vehicle headlight, in particular for a motor vehicle headlight, wherein a blank of transparent, in particular amorphous plastic material is molded and shaped by means of an injection molding process in an injection mold, wherein the blank is taken out of the injection mold, wherein the blank is cooled (occurring actively, in particular by adding a coolant or heat, or passively by waiting), wherein the blank is subsequently placed on a bottom mold of a final contour mold including the bottom mold and a top mold, wherein the contact face between the bottom mold and the blank is no larger than 20% of the maximum cross sectional face of the blank when viewed in parallel to the contact face between the bottom mold and the blank, and wherein the blank is subsequently, by means of the final contour mold, blank-molded/shaped, in particular blank-pressed/molded to form the lens element. Herein, the blank is in particular molded/shaped such that it essentially has the same mass as the lens element.

DETAILED DESCRIPTION

Figure 1:
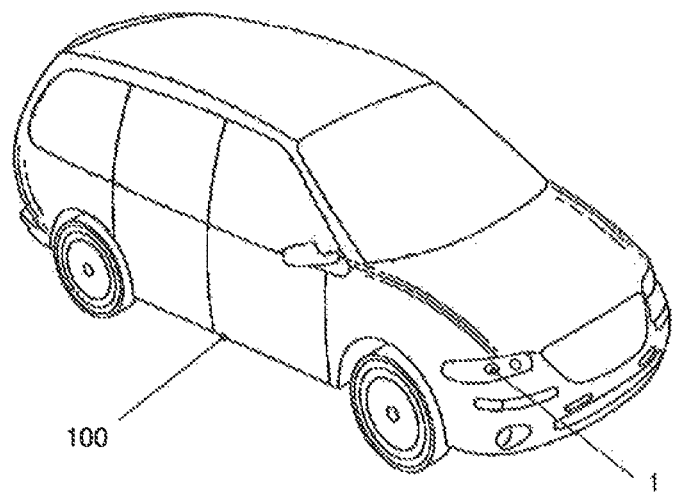
FIG. 1 shows an example of embodiment of a motor vehicle.
Figure 2:
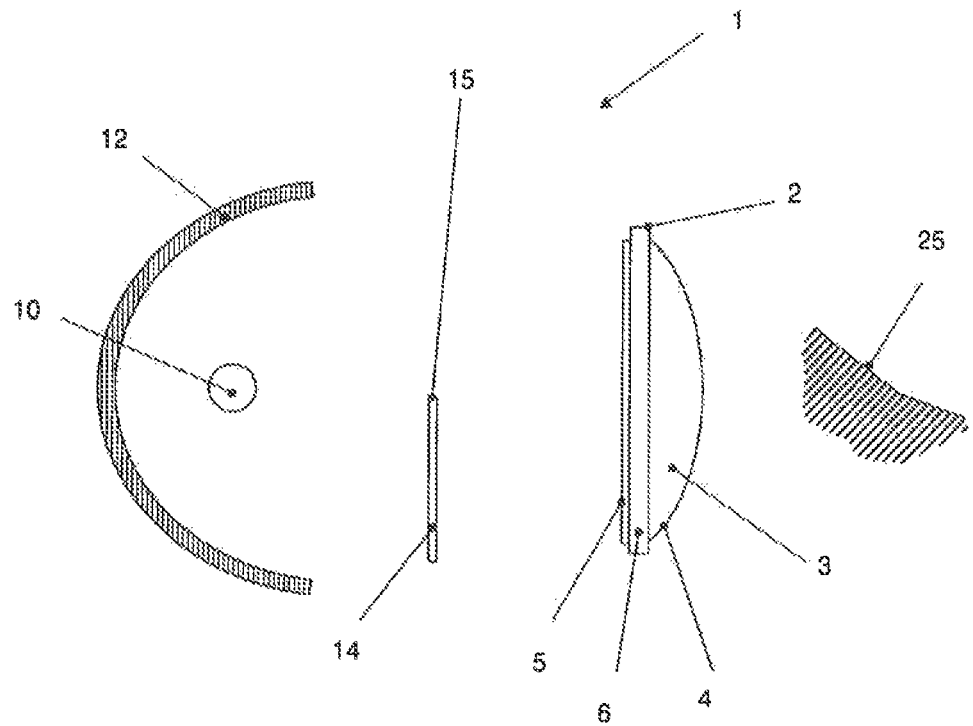
FIG. 2 shows a schematic representation of an exemplary vehicle headlight.
Figure 3:
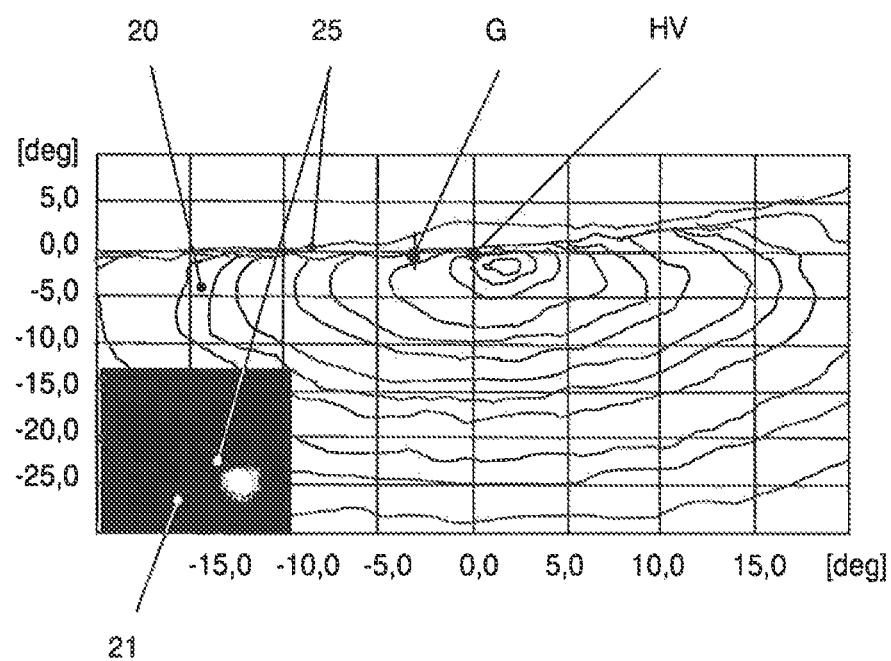
FIG. 3 shows and exemplary illumination or light distribution of the headlight according to FIG. 2.

FIG. 1 shows a motor vehicle 100 having a vehicle headlight 1 schematically depicted in FIG. 2 including a light source 10 for generating light, a reflector 12 for reflecting light generated by means of the light source 10, and a shield, diaphragm or aperture 14. The vehicle headlight 1 moreover comprises a monolithic headlight lens 2 blank-molded (bright-pressed) on both sides for changing the beam direction of light to be generated by means of the light source 10, and in particular for imaging an edge of the shield 14, which edge has been denominated by reference numeral 15 in FIG. 2, as a light-dark-borderline 25, as has been represented, by way of example, in FIG. 3 in a diagram 20 and in a photograph 21. Herein, the gradient G of the light-dark-borderline 25 and the glare (value) HV of the vehicle headlight 1 in which the headlight lens 2 has been installed, are important photometric guide values.

The headlight lens 2 comprises a lens body 3 made of transparent material, in particular glass, which body comprises an essentially planar optically effective (operative) surface 5 facing the light source 10 and a convexly curved optically effective/operative surface 4 turned or facing away from the light source 10. The headlight lens 2 moreover optionally comprises an edge or rim 6, by means of which the headlight lens 2 can be mounted, i.e. this is attached within the vehicle headlight 1.

Figure 4:
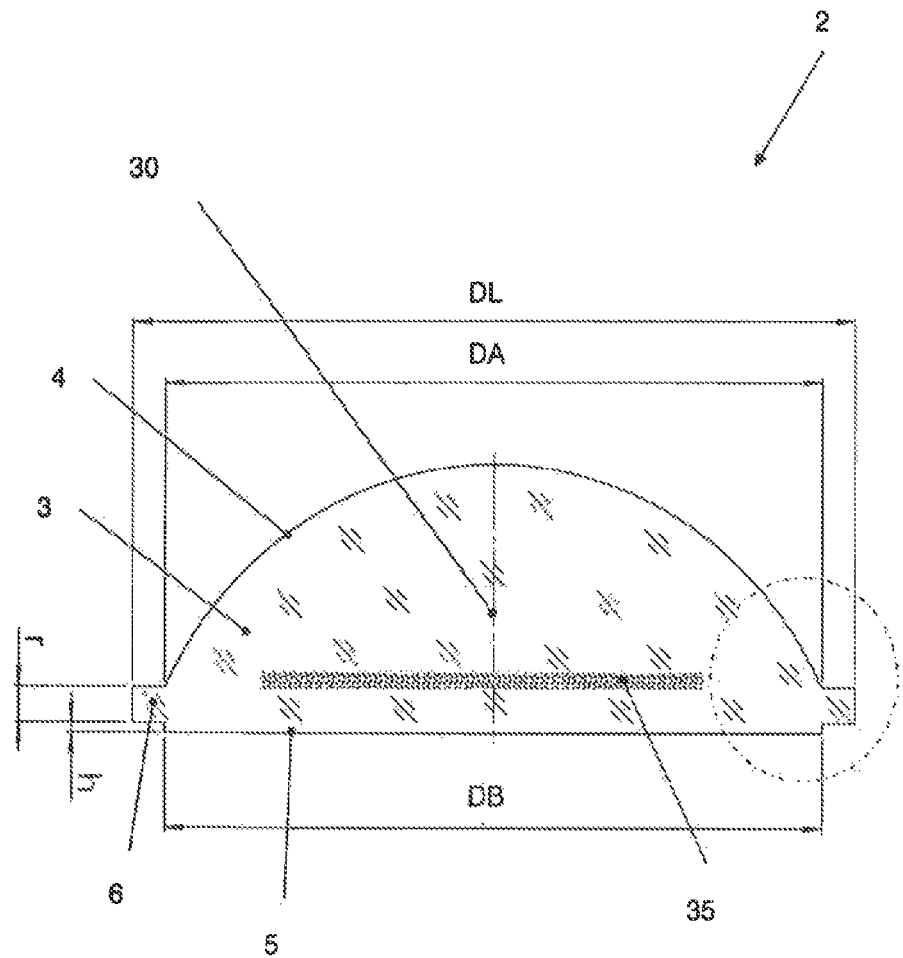
FIG. 4 shows a cross-section through an example of embodiment of a headlight lens for a vehicle headlight according to FIG. 2.
Figure 5:
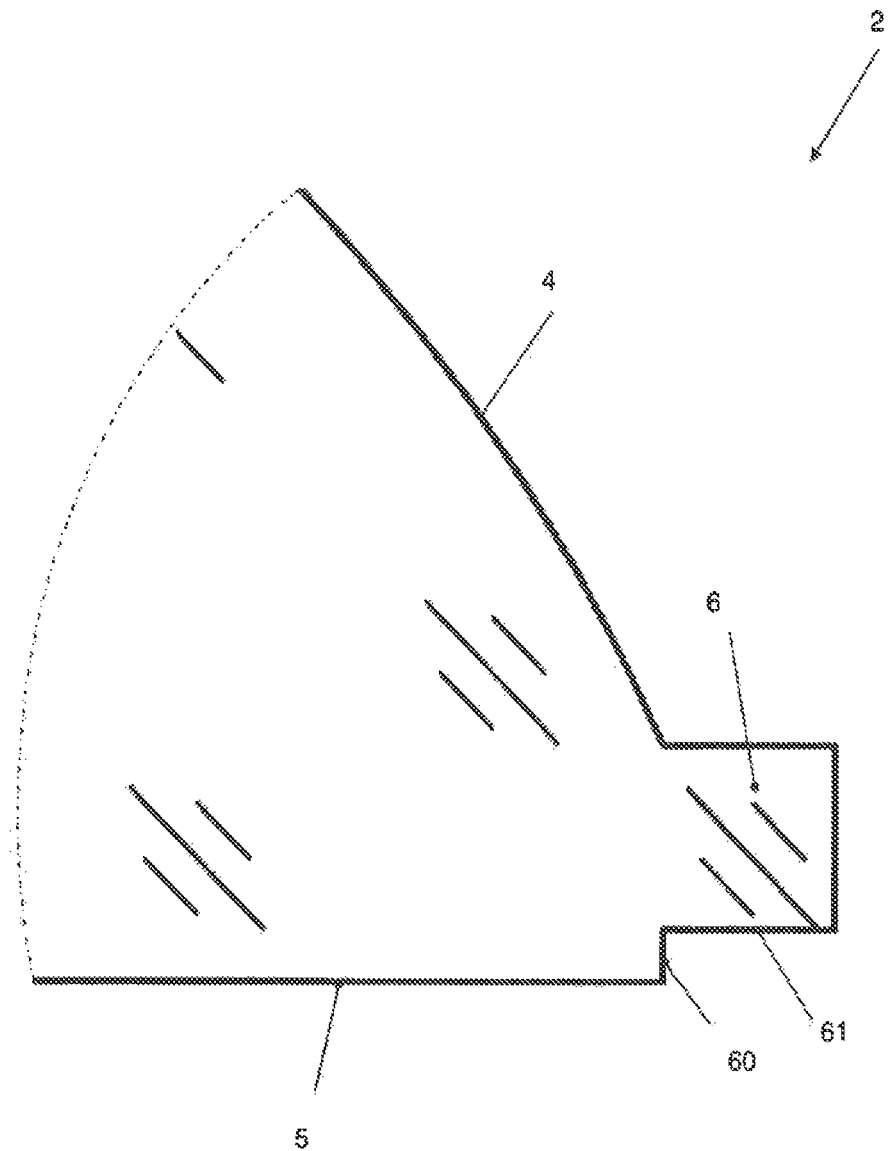
FIG. 5 shows a cut-out of the cross-section according to FIG. 4.

FIG. 4 shows a cross-section through an example of embodiment of the headlight lens 2 for the vehicle headlight 1 according to FIG. 2. FIG. 5 shows a cut-out of the headlight lens 2, which cut-out has been marked by means of a dash-dotted circle in FIG. 4. The essentially planar optically operative surface 5 projects, shaped as a cascade or step 60 and extending in the direction of the optical axis 30 of the headlight lens 2, beyond the lens edge 6 or beyond the surface 61 of the lens edge 6 facing the light source 10, wherein the height h of step 60 amounts to no more than 1 mm, in particular no more than 0.5 mm. The effective value of height h of step 60 expediently amounts to 0.2 mm.

The thickness r of the lens edge 6 amounts to at least 2 mm but to no more than 5 mm. The diameter DL of the headlight lens 2 amounts to at least 40 mm but to no more than 100 mm. The diameter DB of the essentially planar optically operative surface 5 equals the diameter DA of the convexly curved optically operative surface 4. In an expedient embodiment, the diameter DB of the essentially planar optically operative surface 5 amounts to no more than 110% of the diameter DA of the convexly curved optically operative surface 4. Moreover, the diameter DB of the essentially planar optically operative surface 5 in particular amounts to at least 90% of the diameter DA of the convexly curved optically operative surface 4. The diameter DL of the headlight lens 2 is in particular approximately 5 mm larger than the diameter DB of the essentially planar optically operative surface 5 or than the diameter DA of the convexly curved optically operative surface 4.

In the interior of the transparent body 3 the headlight lens 2 has a structure 35 dispersing light. The light dispersing structure 35 is in particular a structure generated by means of a laser. In this context, it comprises in particular a number of punctiform defects which are aligned with respect to a plane which is orthogonal with respect to the optical axis 30. It may be provided for that the dispersing structure 35 be designed to be ring-shaped or comprises annular regions or that the punctiform defects are arranged in the manner rings, respectively. It may be provided for that the punctiform defects are distributed at random, in particular within the selected structure.

For example, appropriate methods for generating the light dispersing structure 35 in the interior of the transparent body 3 may be taken from SU 1838163 A3, SU 1818307 A1, from the article "Optical applications of laser-induced gratings in Eu-doped glasses", Edward G. Behrens, Richard C. Powell, Douglas H. Blackburn, 10 Apr. 1990/Vol. 29, No. 11/APPLIED OPTICS, from the article "Relationship between laser—induced gratings and vibrational properties of Eu-doped glasses", Frederic M. Durville, Edward G. Behrens, Richard C. Powell, 35, 4109, 1987, The American Physical Society, from the article "Laser—induced refractive—index gratings in Eu-doped glasses", Frederic M. Durville, Edward G. Behrens, Richard C. Powell, 34, 4213, 1986, The American Physical Society, from the article "Interior Treatment of Glass by means of Nd: YAG-Laser" ("Innenbearbeitung von Glas mit Nd: YAG-Laser"), Klaus Dickmann, Elena Dik, Laser Magazin, as well as from the state of the art cited in U.S. Pat. No. 6,992,804 B2.

In an alternative embodiment of the headlight lens 2, it may be provided that (instead of the edge 6) the lens comprises a projecting edge (projecting in a rearward direction or in the direction of the side facing the light source), as has e.g. been disclosed in WO/03/087893 A1, DE 203 20 546 U1, EP 1 495 347 A1, DE 102 16 706 A1, EP 1645545, and DE 10 2004 048 500 A1.

Figure 6:
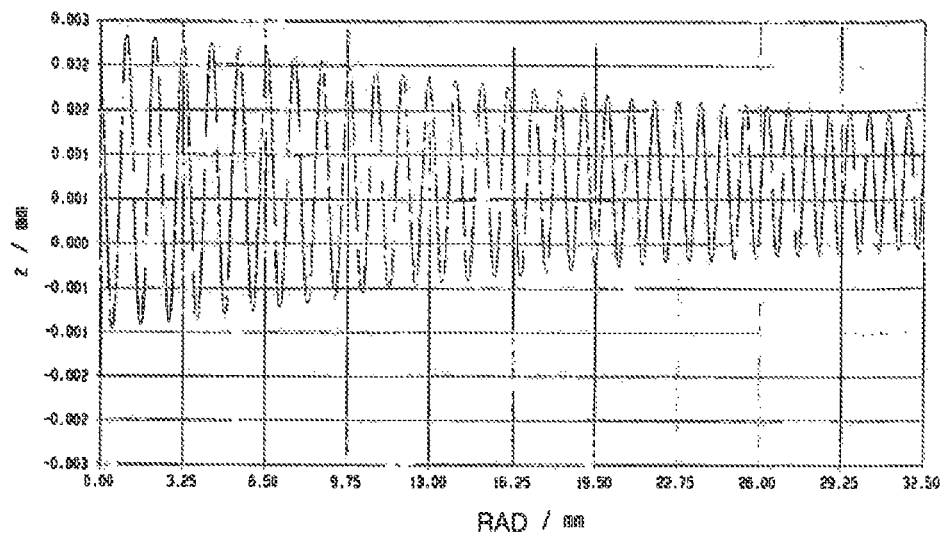
FIG. 6 shows an example of embodiment of a modulation of an optically operative surface of the headlight lens according to FIG. 2.

FIG. 6 shows an example of embodiment of a modulation of an optically operative surface 4 of the headlight lens 2. Herein, RAD designates the radial distance along the optically operative surface 4 from the point of penetration of the optical axis 30 through the optically operative surface 4. Reference sign z designates the modulation. Herein, it is provided that the amplitude of modulation z follows a fading-out envelope.

Figure 7:
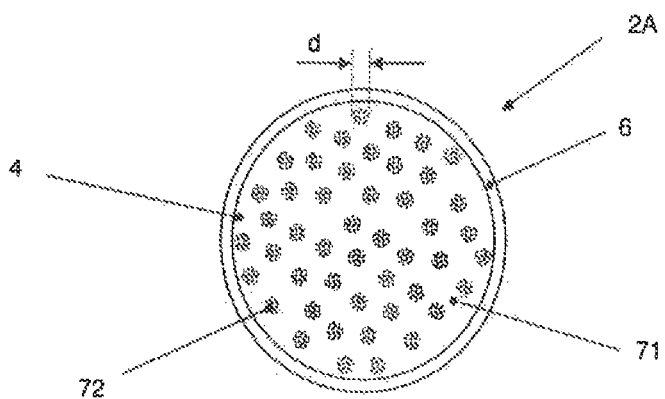
FIG. 7 shows an alternative example of embodiment of a headlight lens.

FIG. 7 shows an alternative example of embodiment of a headlight lens 2A for use instead of the headlight lens 2. Therein, several essentially circle-shaped areas 72 having a diameter d of between 0.5 mm and 10 mm and a (surface) roughness of at least 0.05 μm in particular at least 0.08 μm are arranged on the optically operative surface 4 facing away from the light source 10. In the present example of embodiment, the essentially circular areas 72 have a roughness of 0.6 μm Reference numeral 71 designates the portion of the optically operative surface 4 facing away from the light source 10, which portion is not covered by the essentially circular areas 72. The surface of this portion is blank/bright, i.e. it has a roughness of approximately less than 0.04 μm. It may, however, also be provided for that this portion is not blank/bright but has a roughness which differs from the roughness of the essentially circular areas 72. The essentially circular areas 72 cover 5% to 50% of the optically operative surface 4 facing away from the light source 10.

Figure 8:
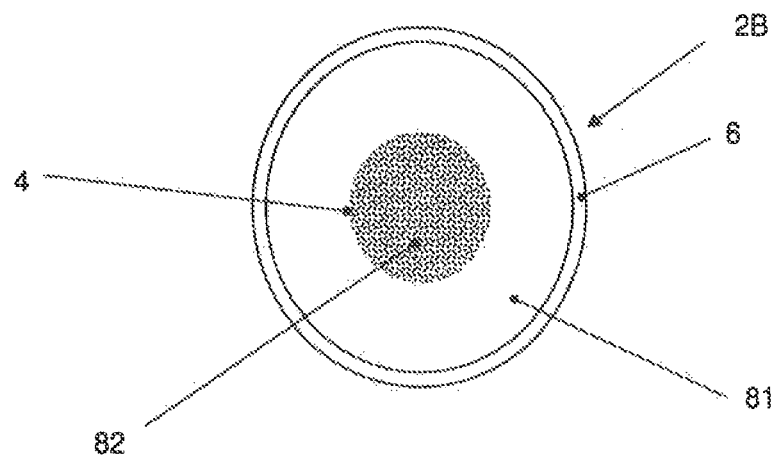
FIG. 8 shows a further alternative example of embodiment of a headlight lens.

FIG. 8 shows a further alternative example of embodiment of a headlight lens 2B for use instead of the headlight lens 2. In this context, an essentially circular surface 82 having a (surface) roughness of at least 0.05 μm, in particular at least 0.08 μm, is arranged on the optically operative surface 4 facing away from the light source 10. In the present example of embodiment, the essentially circular surface 82 has a roughness of 0.2 μm. Reference numeral 81 designates such part of the optically operative surface 4 facing away from the light source 10 which is not covered by the essentially circular surface 82. The surface of this part is blank, i.e. it has a roughness of approximately less than 0.04 μm. It may, however, also be provided for that this portion is not blank but has a roughness which differs from the roughness of the essentially circular surface 82. The essentially circular surface 82 covers at least 5% of the optically operative surface 4 facing away from the light source 10.

Figure 9:
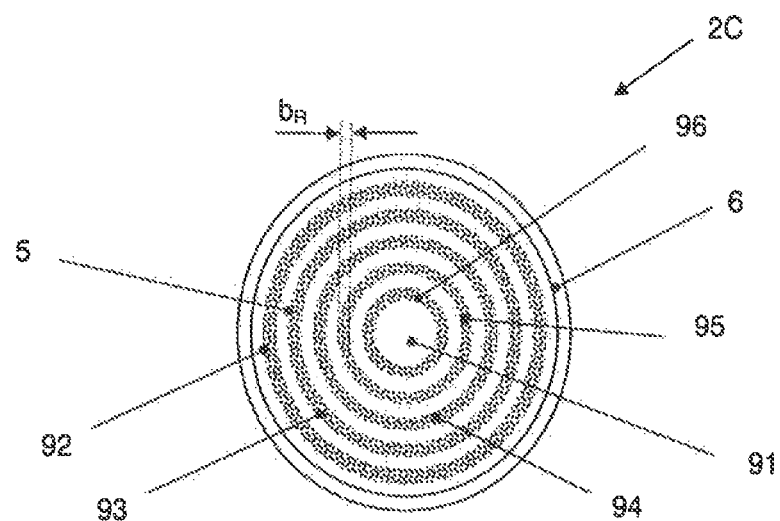
FIG. 9 shows a further alternative example of embodiment of a headlight lens.

FIG. 9 shows a further alternative example of embodiment of a headlight lens 2C for use instead of the headlight lens 2. Herein, several essentially ring-shaped areas 92, 93, 94, 95, 96 arranged within each other and having a ring width $b_R$ of between 1 mm and 4 mm and a (surface) roughness of at least 0.05 μm, in particular at least 0.08 μm, are arranged on the essentially planar surface 5 facing the light source 10. In the present example of embodiment, the essentially ring-shaped areas 92, 93, 94, 95, 96 have a roughness of 0.1 μm. Reference numeral 91 designates such portion of the essentially planar surface 5 facing the light source 10 which is not covered by the essentially ring-shaped areas 92, 93, 94, 95, 96. The surface of this portion is blank, i.e. it has a roughness of approximately less than 0.04 μm. It may, however, also be provided that this portion is not blank/bright but has a roughness which differs from the roughness of the essentially circular areas 22. The essentially ring-shaped areas 92, 93, 94, 95, 96 cover 20% to 70% of the essentially planar surface 5 facing the light source 10.

Figure 10:
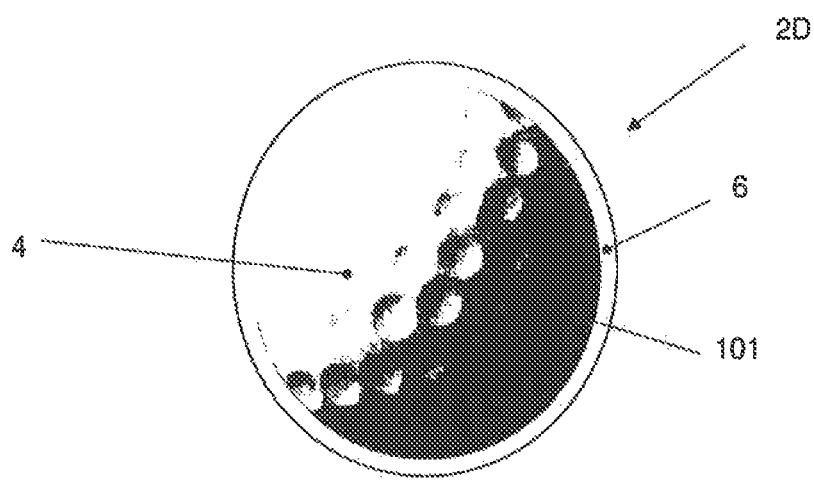
FIG. 10 shows a further alternative example of embodiment of a headlight lens.

FIG. 10 shows a further alternative example of embodiment of a headlight lens 2D for use instead of the headlight lens 2. Herein, the optically operative surface 4 facing away from the light source 10 has a surface structure 101 simulating the surface of a golf ball. A similar surface structure may also be generated by a modulation z represented in FIG. 6, which is superimposed by a modulation extending orthogonally thereof (i.e. on a (concentric) circle around the optical axis 30).

Figure 11:
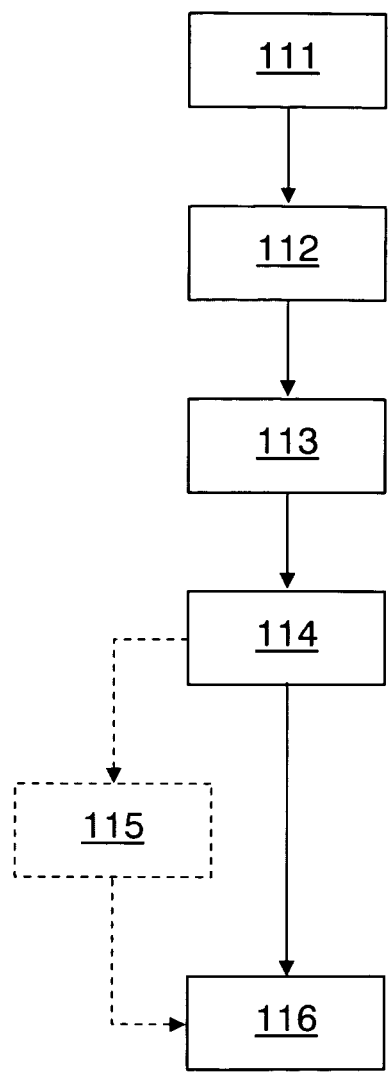
FIG. 11 shows an example of embodiment of a process for manufacturing a headlight lens according to FIG. 4.

FIG. 11 shows a process for manufacturing the headlight lens 2 or one of the headlight lenses 2A, 2B, 2C, or 2D. Herein, transparent thermal plastic material is produced or liquefied, respectively, in a step 111. The transparent thermoplastic plastic material is, in particular, Makrolon LED2045 or a thermoplastic resin such as e.g. a polycarbonate resin, a polyacrylic resin or a modified polyolefin resin. Examples for appropriate thermoplastic plastic material or thermoplastic resin may be taken, in particular, from DE 699 23 847 T2. As a polycarbonate resin, DE 699 23 847 T2 consequently discloses the appropriate use of aromatic polycarbonate resin which has been obtained by processing a diphenol and a carbonate precursor. In this context, examples for the diphenol include bis-(hydroxylaryl)-alkanes such as 2,2-bis-(4-hydroxyphenyl)-propane (so-called bisphenol A), bis-(4-hydroxyphenyl)-methane, 1,1-bis-(4-hydroxyphenyl)-ethane, 2,2-bis-(4-hydroxyphenyl)-butane, 2,2-bis-(4-hydroxyphenyl)-octane, 2,2-bis-(4-hydroxyphenyl)-phenylmethane, 2,2-bis-(4-hydroxy-3-methylphenyl)-propane, 1,1-bis-(4-hydroxy-3-tert-butylphenyl)-propane, 2,2-bis-(4-hydroxy-3-bromophenyl)-propane, 2,2-bis-(4-hydroxy-3,5-dibromophenyl)-propane and 2,2-bis-(4-hydroxy-3,5-dichlorophenyl)-propane; bis-(hydroxyphenyl)-cycloalkane such as 1,1-bis-(hydroxyphenyl)-cyclopentane and 1,1-bis-(hydroxyphenyl)-cyclohexane; dihydroxyarylethers such as 4,4'-dihydroxydiphenylether and 4,4'-dihydroxy-3,3'-dimethyldiphenylether; dihydrodiarylsulfides such as 4,4'-dihydroxy-diphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3, 3'-dimethyldiphenylsulfone. These diphenols may be used per se or by way of a combination of two or more products.

Figure 12:
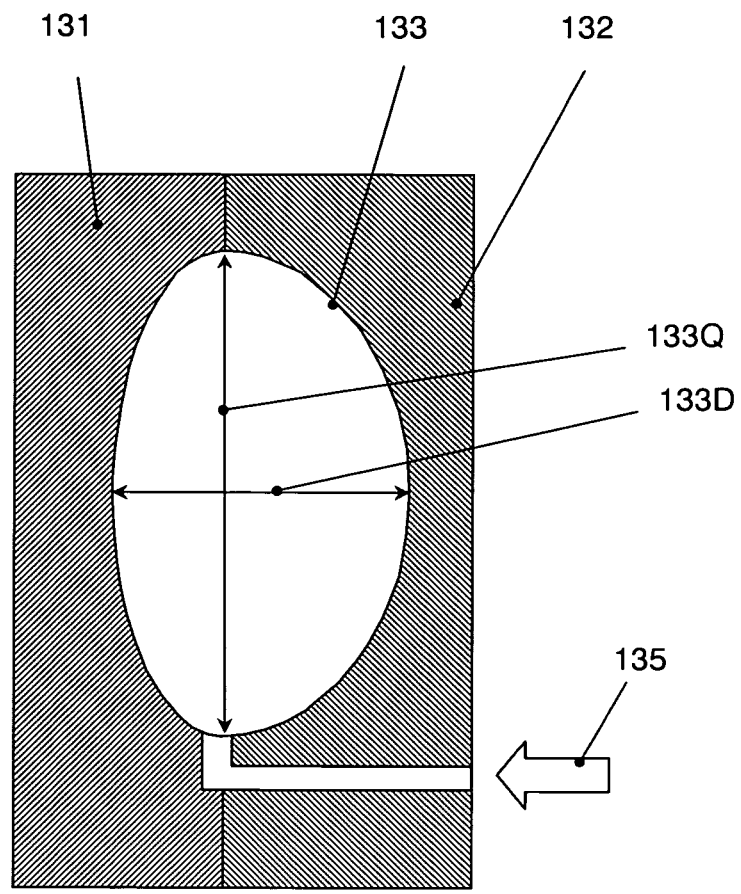
FIG. 12 shows an example of embodiment of an injection mold by way of a principle representation.
Figure 13:
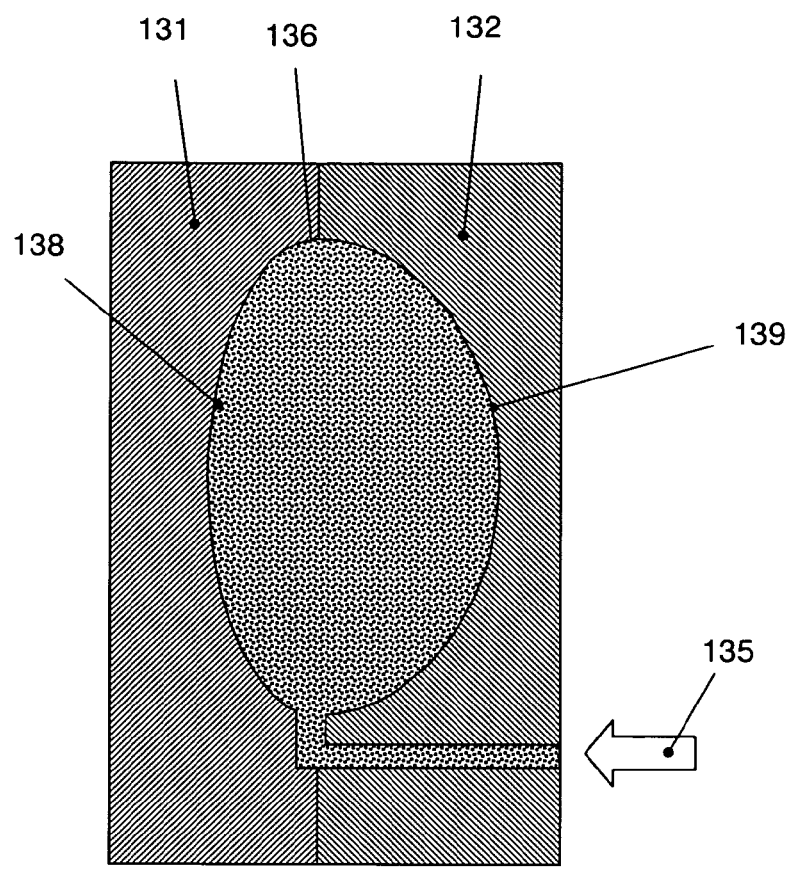
FIG. 13 shows an injection mold according to FIG. 12 in a filled state

Step 111 is followed by a step 112 in which—as has been represented in FIG. 12 and FIG. 13—a blank 136 is molded from the transparent plastic material by means of an injection molding process in an injection mold. The injection mold represented by way of a principle representation in FIG. 12 and FIG. 13 comprises a partial mold (mold part/component) 131 and a partial mold (mold part/component) 132. The partial mold 131 and the partial mold 132 together form, when in a closed state of the injection mold, an injection mold cavity 133, whose thickness 133D amounts to 50% to 70% of the diameter 133Q of the injection mold cavity 133. The portion of the injection mold cavity of the mold part 131 and the portion of the injection mold cavity 132 essentially form a transition with each other having a continuous first derivative or configured without any bend/.kink, respectively. The partial mold 131 and the partial mold 132, respectively, form an example of embodiment for injection mold parts/components in the sense of the claims. The injection cavity 133 has a volume of approximately 63 ccm.

Figures 14, 15:
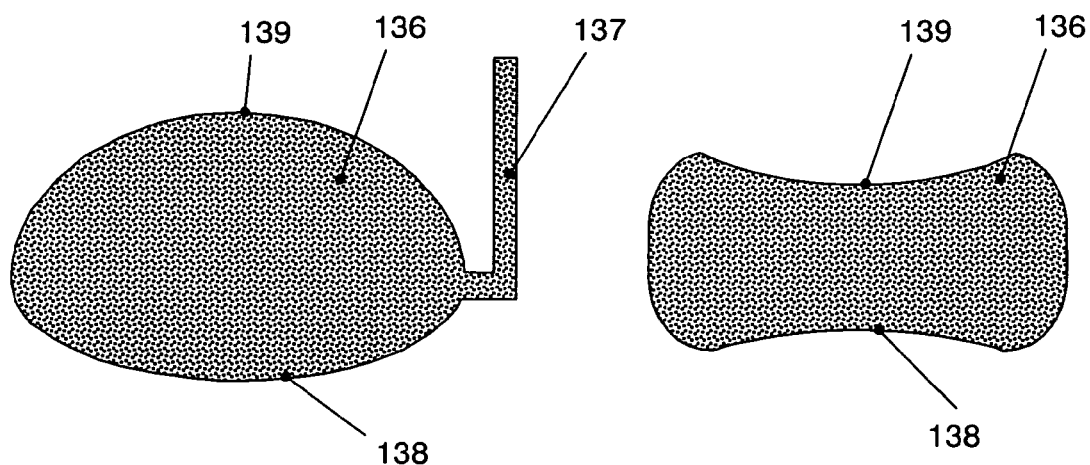
FIG. 14 shows an example of embodiment of a blank produced by means of an injection mold according to FIG. 12 immediately after having been taken from the injection mold.
FIG. 15 shows an example of embodiment of a blank produced by means of an injection mold according to FIG. 12 after having cooled down and after removing a sprue.

As has been depicted by arrow 135, the essentially fluid transparent plastic material is pressed into the injection mold such that the blank 136 is molded with a sprue 137. By opening the partial molds 131 and 132, the blank 136—represented in FIG. 14—may be removed. In this context it is provided for that the blank 136 be taken out of the injection mold before its mean temperature falls below the melting temperature of the plastic material and/or the flow temperature of the plastic material. Consequently, the dwell time within the injection mold is, in particular, less than 1 minute. The A step 113 follows, in which the blank 136 is tempered and/or cooled off. In tempering, the blank 136 is first cooled down and subsequently heated, so that its gradient of temperature is inverted, which means that before tempering the core of the blank 136 is warmer than the outer region of the blank 136, and that after tempering the outer region of the blank 136 is warmer than the core of the blank 136. FIG. 15 shows the blank 136 after the cooling down with the sprue removed. It may, in particular, be provided for that the sprue be broken off at a weakened position. As can be clearly realised, the surfaces and 138 and 139 which are convex when taking out the blank 136 change into concave surfaces.

Figure 16:
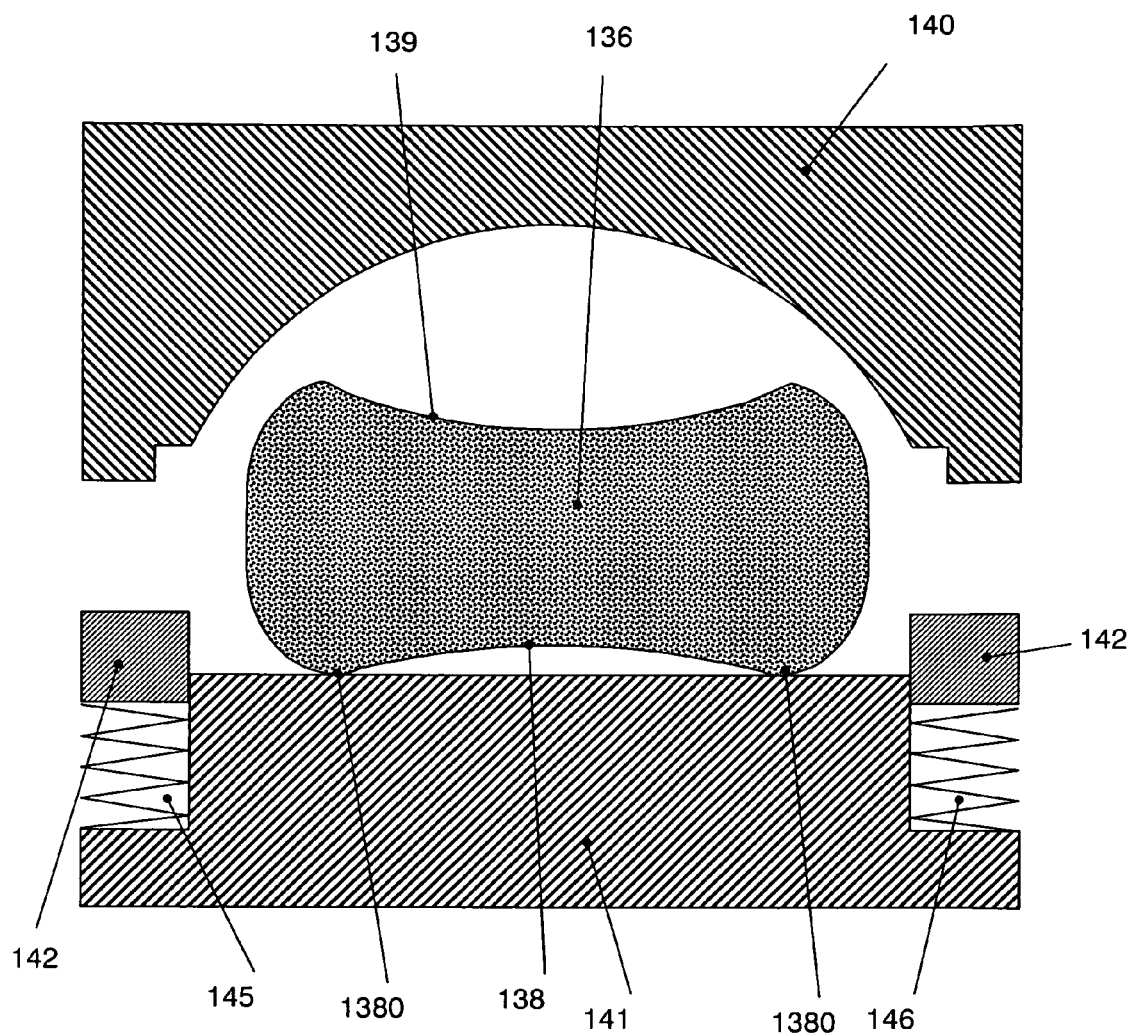
FIG. 16 shows an example of embodiment of a final contour mold by way of a cross sectional principle representation.
Figure 17:
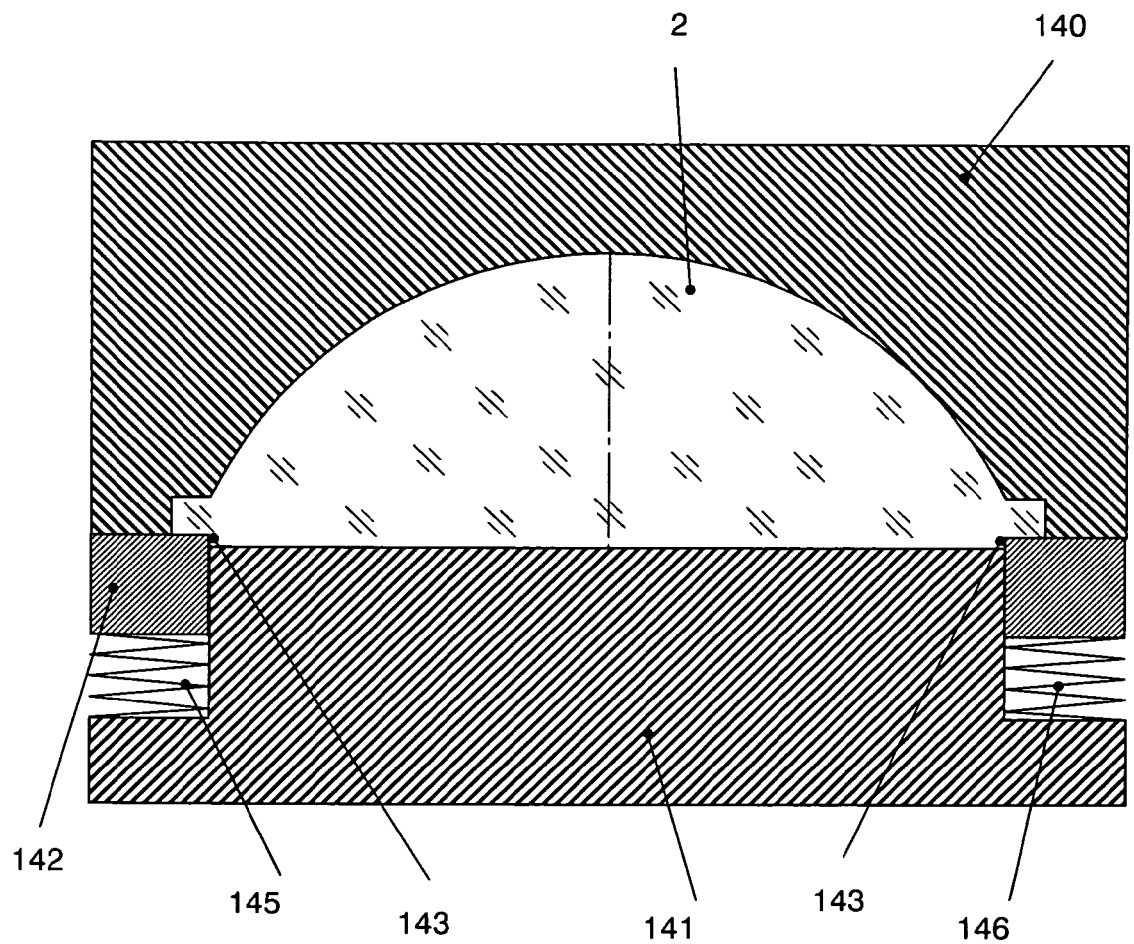
FIG. 17 shows the final contour mold according to FIG. 16 after the closing movement.

A step 114 follows in which the blank (pre-form) 136 is (blank-) pressed—by means of a final-shape (contour) mold represented in FIG. 16 and FIG. 17—between a top mold 140 and a bottom mold, the latter comprising a first partial mold 141 and a second partial mold 142 which is annular shaped and encloses the first partial mold 141, to form a headlight lens 2 with an integrally molded lens edge or rim 6, wherein, by means of an offset 143 between the first partial mold 141 and the second partial mold 142 and depending on the volume of the blank 136, the cascade or step 60 is pressed into the headlight lens 2.

For pressing, the blank 136 is placed—as depicted in FIG. 16—on the bottom mold or on the partial mold 141 thereof, respectively, so that the contact face 1380 between the blank 136 and the bottom mold or the partial mold 141 thereof, respectively, is no larger than 20% of the maximum cross sectional face of the blank 136 when viewed in parallel to the contact face 1380 between the bottom mold or the partial mold 141 thereof, respectively, and the blank 136.

The pressing of the blank 136 is, in particular, not performed in vacuum or under significant low-pressure. The pressing of the blank 136 to form the headlight lens 2 particularly occurs under atmospheric air-pressure. The first partial mold 141 and the second partial mold 142 are non-positively coupled together by means of springs 145 and 146. Herein, the pressing is performed such that the distance between the first partial mold 141 and the top mold 140 is dependent on the volume of the blank (pre-form) or of the headlight lens 2 pressed from it, respectively, and the distance between the second partial mold 142 and the top mold 140 is independent of the volume of the blank (pre-form) or of the headlight lens 2, respectively, pressed from it. After the pressing, the headlight lens 2 is cooled down and, if necessary, the essentially planar surface 5 is polished.

Optionally, the step 114 may be followed by a step 115 in which the gradient of a headlight lens is measured and a structure corresponding to the light dispersing structure 35 is introduced in this or another headlight lens in dependency on the measured value of the gradient.

In a step 116 following step 114 or step 115, respectively, the headlight lens 2 is packaged in a transport container for the transport of headlight lenses together with further headlight lenses, designed corresponding to headlight lens 2.

The standard deviation of the gradient of the headlight lenses is smaller than or equal to 0.005. The standard deviation of the glare (value) of the batch of headlight lenses 2 or of the vehicle headlights, respectively, in which the headlight lenses 2 are to be installed is in particular smaller than or equal to 0.05 lux. In an embodiment, there is provided that the standard deviation of the value 75R of the headlight lenses 2 or of the vehicle headlights, in which the headlight lenses 2 have been installed, be smaller than or equal to 0.5 lux.

The elements in the figures have been drawn in consideration of simplicity and clearness and not necessarily to scale. Thus, for example, the order of magnitude of some elements has been exaggerated with respect to other elements in order to improve comprehension of the example of embodiment of the present invention.

The invention claimed is:

1. A method for manufacturing a headlight lens for imaging a light-dark-borderline on a roadway, the method comprising:
   providing an injection mold having an injection mold cavity whose thickness is no smaller than 50% of the diameter of the injection mold cavity;
   providing a final contour mold;
   injection molding a blank of transparent plastic material by means of said injection mold;
   cooling the blank and the removing the blank from the injection mold before its mean temperature goes below the flow temperature of the plastic material; and
   press-molding the blank by means of said final contour mold to form the headlight lens for imaging a light-dark-borderline on a roadway.

2. The method as claimed in claim 1, wherein the thickness of the injection mold cavity is no larger than 70% of its diameter.

3. The method as claimed in claim 2, wherein the injection mold includes a first injection mold component and at least a second injection mold component, wherein a portion of an injection mold cavity of the first injection mold component and a portion of an injection mold cavity of the second injection mold component form a transition with each other, which transition has a continuous first derivative without any bend or kink.

4. The method as claimed in claim 1, wherein the injection mold cavity includes a first area for molding a first convex surface of the blank immediately after filling the injection mold and a second area opposing the first area, and for molding a second convex surface of the blank immediately after filling the injection mold, wherein the first area and the second area form a transition with each other having a continuous first derivative without any bend or kink.

5. The method as claimed in claim 1, wherein the injection mold includes a first injection mold component and at least a second injection mold component, wherein a portion of an injection mold cavity of the first injection mold component and a portion of an injection mold cavity of the second injection mold component form a transition with each other, which transition has a continuous first derivative without any bend or kink.

6. The method as claimed in claim 1, wherein the injection mold includes a first injection mold component and at least a second injection mold component, wherein a portion of an injection mold cavity of the first injection mold component and a portion of an injection mold cavity of the second injection mold component form a transition with each other, which transition is configured without any bend.

7. The method as claimed in claim 1, wherein the final contour mold includes a bottom mold and a top mold, wherein the blank is placed on the bottom mold.

8. The method as claimed in claim 7, wherein the contact face between the bottom mold and the blank is no larger than 20% of the maximum cross sectional face of the blank when viewed in parallel to the contact face between the bottom mold and the blank.

9. The method as claimed in claim 1, wherein before the press-molding occurs, the blank is cooled down and heated again.

10. A method for manufacturing a headlight lens for imaging a light-dark-borderline on a roadway, the method comprising:
providing an injection mold forming an injection mold cavity, the injection mold including a first injection mold component and at least a second injection mold component, wherein a portion of an injection mold cavity of the first injection mold component and a portion of an injection mold cavity of the second injection mold component form a transition with each other such that the transition has a continuous first derivative without any bend or kink;
providing a final contour mold;
injection molding a blank of transparent plastic material by means of said injection mold;
cooling the blank and the taking the blank out of the injection mold after moving apart the first injection mold component and the second injection mold component; and
press-molding the blank by means of said final contour mold to form the headlight lens for imaging a light-dark-borderline on a roadway.

11. The method as claimed in claim 10, wherein the blank is taken out of the injection mold before its mean temperature goes below the flow temperature of the plastic material.

12. The method as claimed in claim 10, wherein the final contour mold includes a bottom mold and a top mold, wherein the blank is placed on the bottom mold.

13. The method as claimed in claim 12, wherein the contact face between the bottom mold and the blank is no larger than 20% of the maximum cross sectional face of the blank when viewed in parallel to the contact face between the bottom mold and the blank.

14. The method as claimed in claim 10, wherein before the press-molding occurs, the blank is cooled down and heated again.

15. A method for manufacturing a headlight lens for imaging a light-dark-borderline on a roadway, the method comprising:
providing an injection mold;
providing a final contour mold;
injection molding a blank of transparent plastic material is by means of said injection mold;
cooling the blank and then taking the blank out of the injection mold before its mean temperature goes below the flow temperature of the plastic material; and
press-molding the blank by means of said final contour mold to form the headlight lens for imaging a light-dark-borderline on a roadway.

16. The method as claimed in claim 15, wherein the final contour mold includes a bottom mold and a top mold, wherein the blank is placed on the bottom mold.

17. The method as claimed in claim 16, wherein the contact face between the bottom mold and the blank is no larger than 20% of the maximum cross sectional face of the blank when viewed in parallel to the contact face between the bottom mold and the blank.

18. The method as claimed in claim 15, wherein before the press-molding occurs, the blank is cooled down and heated again.

* * * * *